United States Patent [19]

Ridenour et al.

[11] Patent Number: 5,707,087
[45] Date of Patent: Jan. 13, 1998

[54] TUBE FITTING

[75] Inventors: Ralph G. Ridenour, Mansfield; Dennis W. Kerr, Ashland, both of Ohio

[73] Assignee: Universal Enterprises, Inc., Mansfield, Ohio

[21] Appl. No.: 635,024

[22] Filed: Apr. 19, 1996

Related U.S. Application Data

[60] Continuation-in-part of Ser. No. 445,282, May 19, 1995, abandoned, which is a division of Ser. No. 233,846, Apr. 26, 1994, Pat. No. 5,544,406.

[51] Int. Cl.$^6$ .................................................. F16L 25/00
[52] U.S. Cl. ........................... 285/331; 285/351; 285/382; 285/382.5; 285/906
[58] Field of Search .................... 285/382, 382.1, 285/382.2, 331, 351; 29/525

[56] References Cited

U.S. PATENT DOCUMENTS

| | | | |
|---|---|---|---|
| 546,314 | 9/1895 | Farrey | 285/351 X |
| 1,307,537 | 6/1919 | Cole | 285/47 |
| 1,762,766 | 6/1930 | DeGaray | 285/331 |
| 2,319,024 | 5/1943 | Wehringer | 285/256 |
| 2,341,629 | 2/1944 | Kreidel | 285/382 X |
| 2,437,933 | 3/1948 | Brennan | 285/331 X |
| 3,017,203 | 1/1962 | Macleod | 285/259 X |
| 3,125,806 | 3/1964 | Cameron . | |
| 3,556,567 | 1/1971 | O'Connor | 285/382 X |
| 3,834,743 | 9/1974 | Strybel | 285/331 X |
| 4,114,930 | 9/1978 | Perkins et al. | 285/382 X |
| 4,214,358 | 7/1980 | Clere | 285/382 X |
| 4,392,678 | 7/1983 | Adamczyk . | |
| 4,585,255 | 4/1986 | Ridenour | 285/331 X |
| 4,629,221 | 12/1986 | Lumsden et al. | 285/331 X |
| 4,650,228 | 3/1987 | McMills et al. | 285/382 |
| 4,805,944 | 2/1989 | Reginaldo | 285/331 |
| 4,844,516 | 7/1989 | Baker | 285/382.2 X |
| 5,031,301 | 7/1991 | Oetiker | 285/382.7 X |
| 5,080,406 | 1/1992 | Hyatt et al. . | |

FOREIGN PATENT DOCUMENTS

| | | |
|---|---|---|
| 2069420 | 9/1971 | France . |
| 3232-297-A | 1/1984 | Germany . |

*Primary Examiner*—Dave W. Arola
*Attorney, Agent, or Firm*—Pearne, Gordon, McCoy & Granger LLP

[57] ABSTRACT

A tube and fitting assembly for pressurized fluids is provided which may provide a fluid-tight seal up to the bursting pressure of the tube at relatively high temperatures. The tube and fitting assembly includes a malleable tube and a fitting having a first portion forming an external surface, a second portion radially larger than the first portion to form an abutment facing the first portion, and a recess formed within the abutment and facing the first portion. A gasket formed of a high temperature material is provided in the recess. An end of the tube is radially inwardly compressed on the external surface of the fitting and extends into the recess to the gasket. The tube is assembled to the fitting by placing the tube over the first portion of the fitting and the external surface and gripping the tube with jaws having an inward nose projection of a small axial extent at about the forward end of the fitting. The fitting and the tube are longitudinally moved relative to the jaws to longitudinally compress the tube ahead of the nose projection to deform the tube radially inward against the fitting. A portion of the tube is extended into the recess to form a seal between the tube and the fitting by expanding the tube longitudinally into the recess during the step of relative longitudinal movement or by inserting the tube longitudinally into the recess during the step of placing the tube over the first portion of the fitting. Also disclosed are variants of the assembly and method having auxiliary seal members and sleeves used in cooperation with very thin wall tubes.

15 Claims, 4 Drawing Sheets

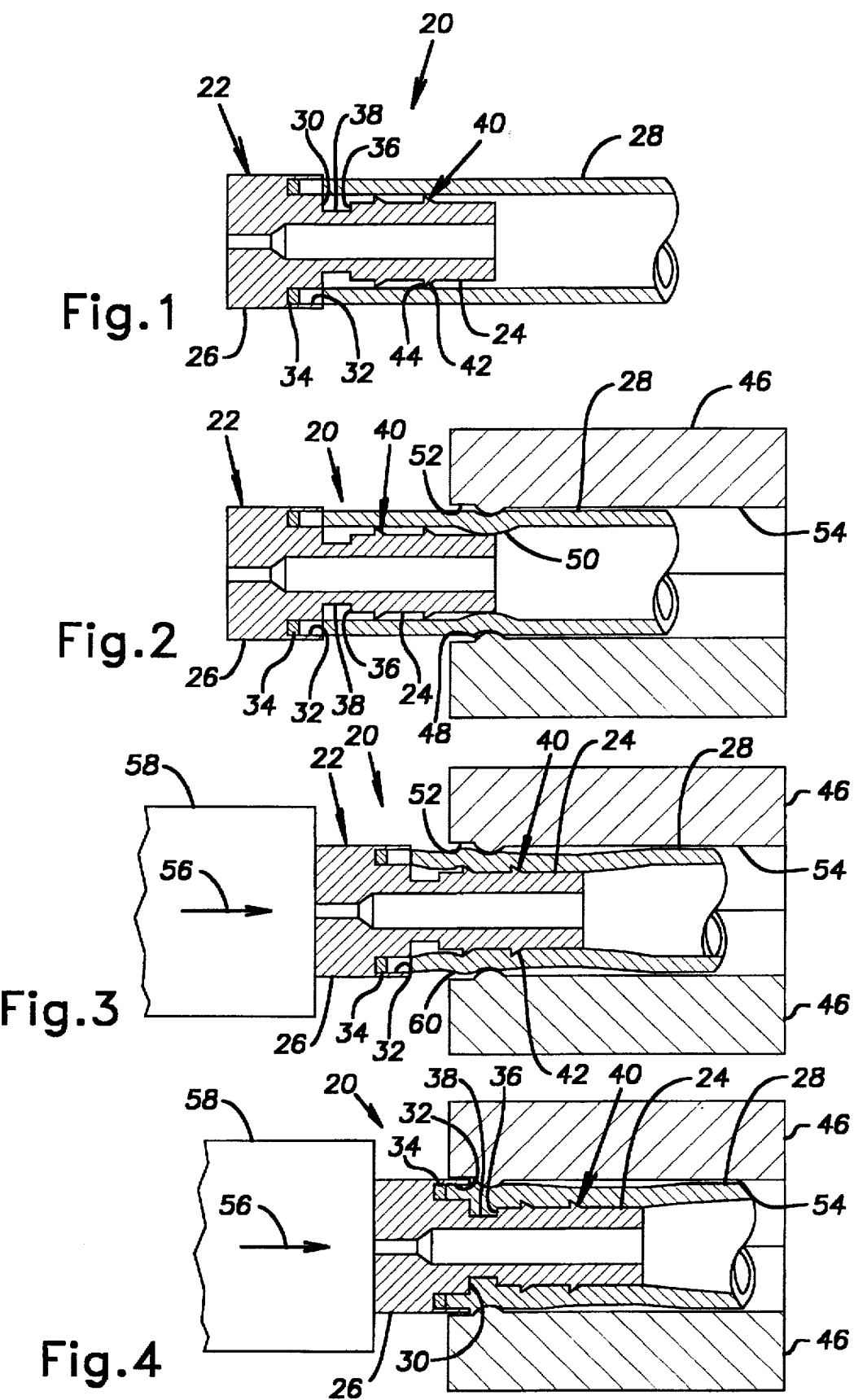

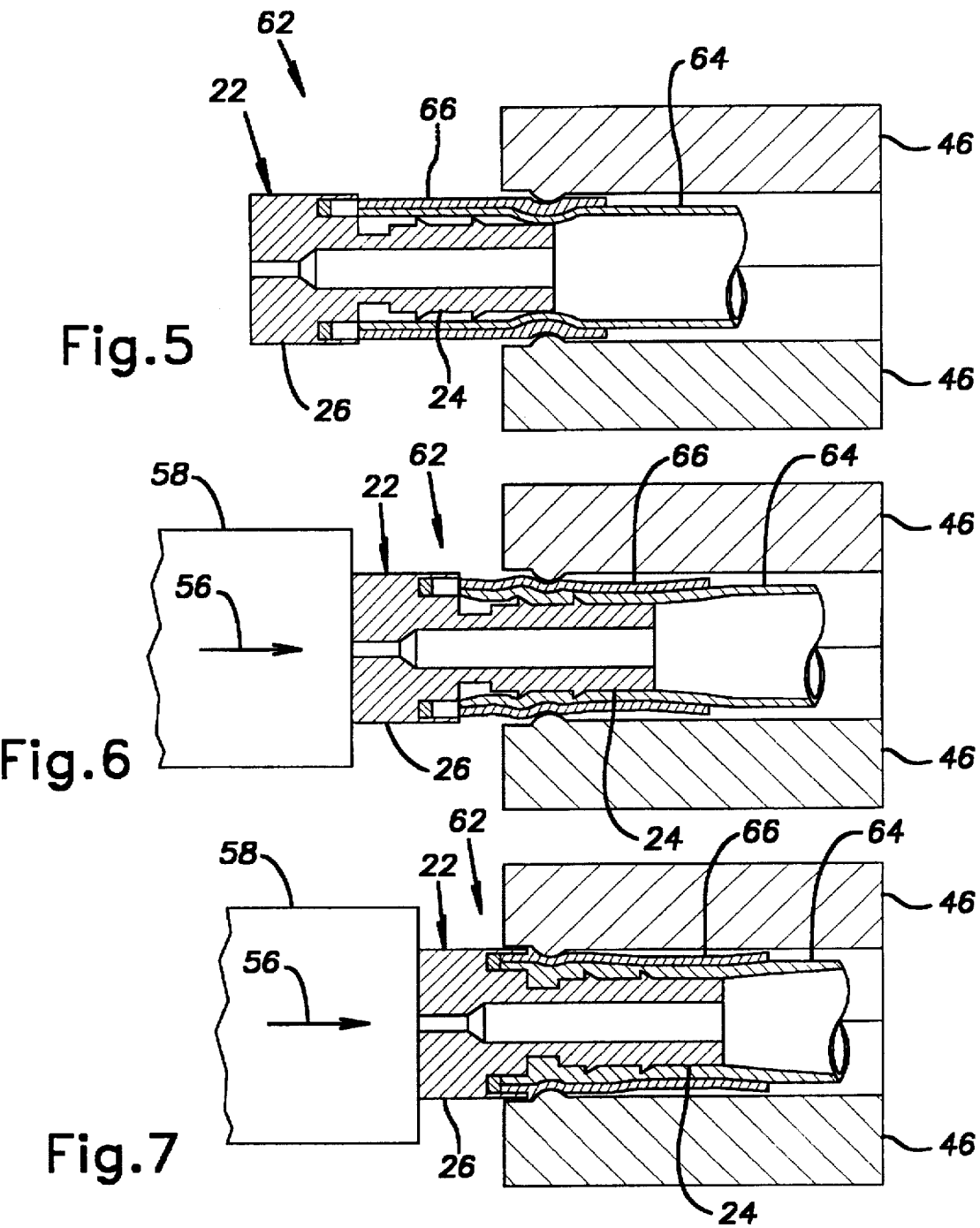

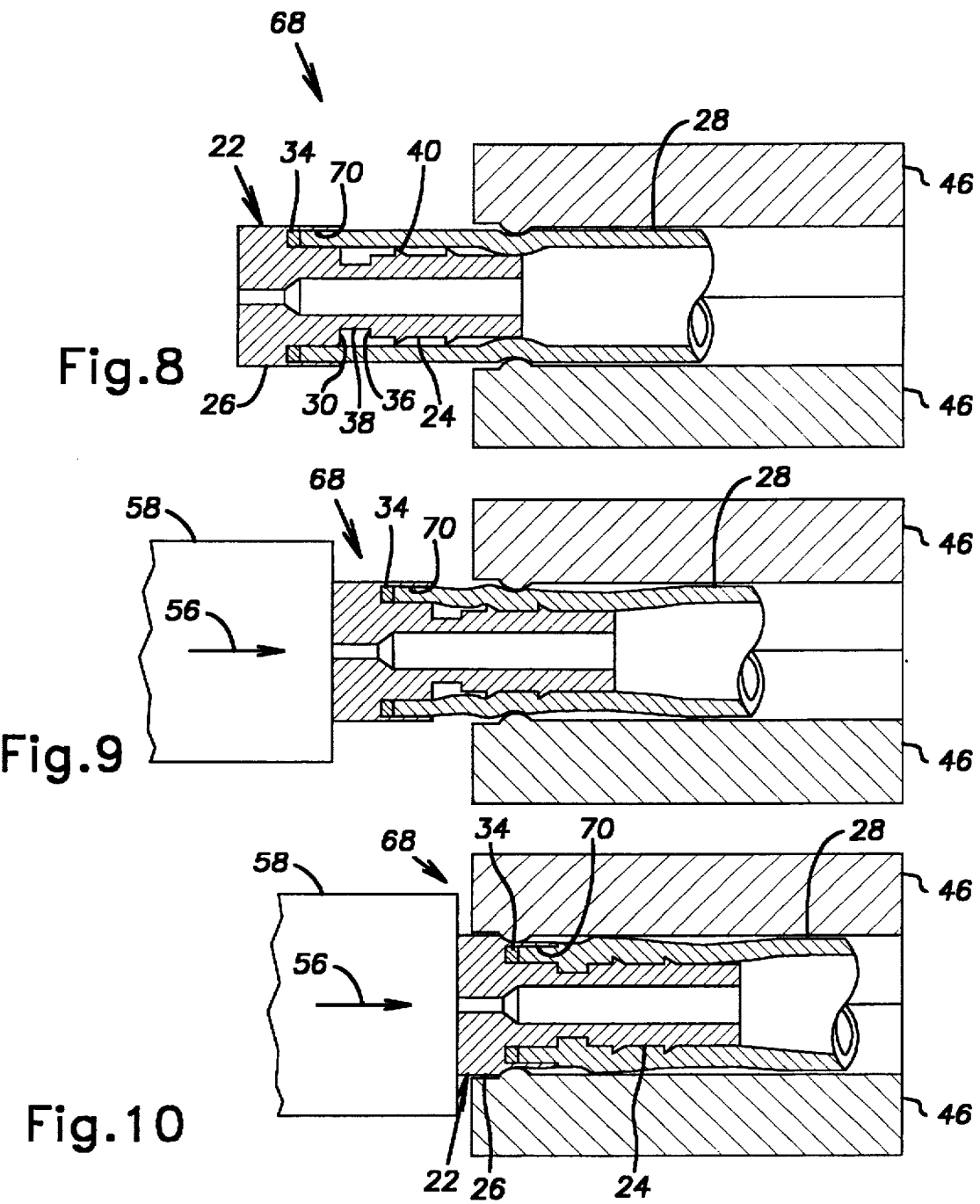

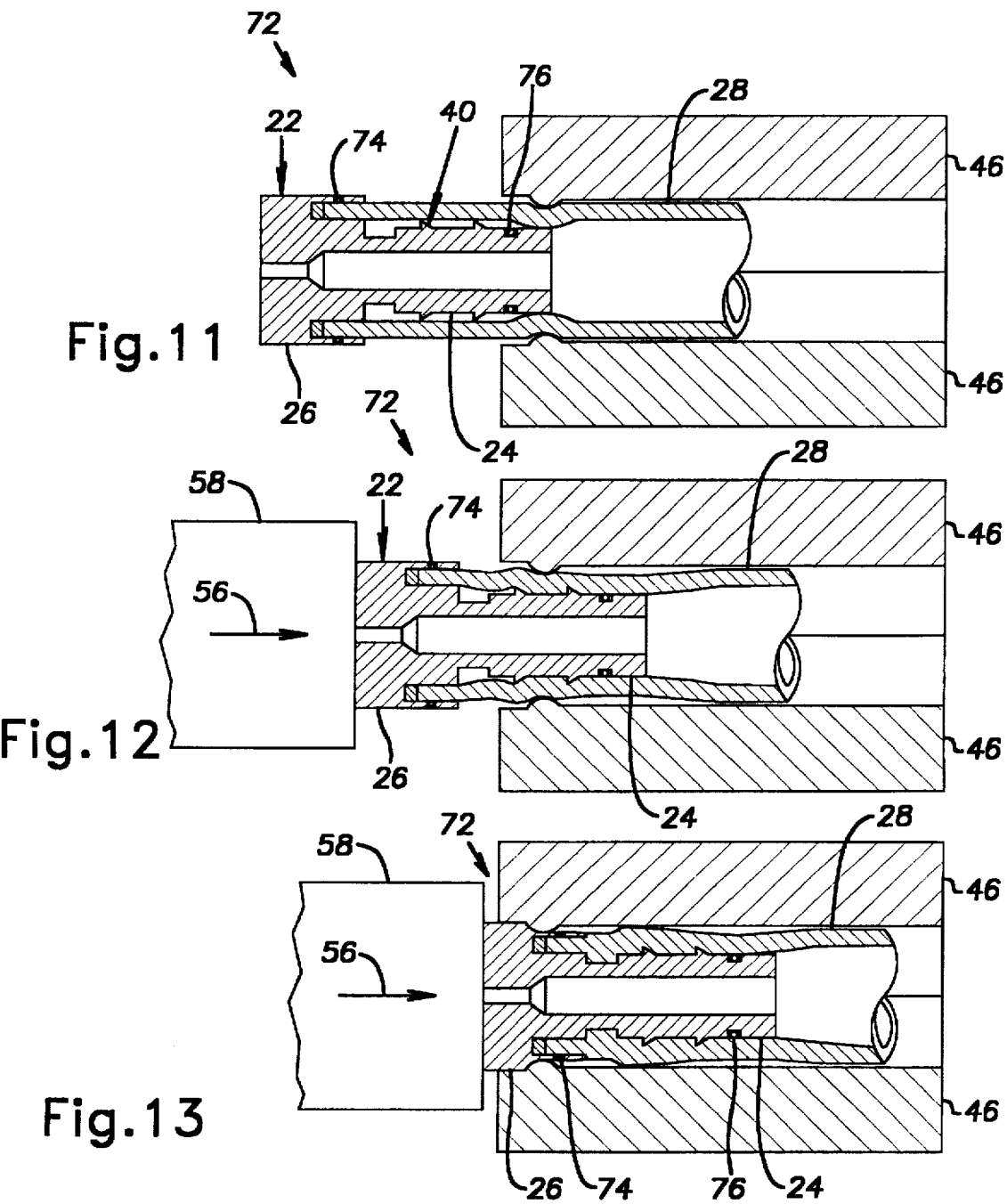

TUBE FITTING

This application is a continuation-in-part of application Ser. No. 08/445,282, filed on May 19, 1995, now abandoned, which is a divisional application of application Ser. No. 08/233,846 filed on Apr. 26, 1994 now U.S. Pat. No. 5,544,406.

BACKGROUND OF THE INVENTION

Tube and fitting assemblies have been devised in many different structures and methods of assembly. The usual case of a tube telescoped over a part of a fitting is where jaws of kind have generally radially compressed the tube into sealing contact with that part of the telescoped tubing and fitting. In such a case, the tube is compressed radially inward to make the seal. This is difficult to actually make a good seal because the tube, even though malleable and deformed past its elastic limit, tends to have a certain amount of elasticity and springs back radially outwardly after the jaw pressure has been removed. Thus, in many cases the fluid-tight seal between the tube and the fitting is destroyed or at least lowered as to the fluid pressure it will withstand. Additionally, at high temperatures the tube and/or fitting may relax. Thus, in many cases the fluid-tight seal between the tube and fitting is destroyed or at least lowered as to the temperature it will withstand.

SUMMARY OF THE INVENTION

The present invention provides a tube and fitting assembly and method of assembly wherein the radial expansion does not occur after the assembly pressure is removed and the assembly jaws longitudinally move relative to the tube to give compression thereof. This longitudinal relative movement causes the tube to bulge outwardly and bulge inwardly in front of the jaws during relative movement so that if there is any relaxation of the tube when the pressure is removed this relaxation is radially inwardly instead of outwardly. This assures a fluid-tight seal which withstands pressure up to the bursting pressure of the tube at relatively high temperatures.

Accordingly, the tube and fitting assembly of the present invention includes a malleable tube and a fitting having a first portion forming an external surface, a second portion radially larger than the first portion to form an abutment facing the first portion, and a recess formed within the abutment and facing the first portion. An end of the tube is radially inwardly compressed on the external surface of the fitting and extends into the recess of the fitting to make a fluid-tight seal between the tube and the fitting which withstands a fluid pressure within the tube. Preferably, a seal member is provided within the recess. A method of assembly of the present invention includes placing the tube over the first portion of the fitting and the external surface and gripping the tube with jaws having an inward nose projection of a small axial extent at about the forward end of the fitting. The fitting and the tube are longitudinally moved relative to the jaws to longitudinally compress the tube ahead of the nose projection to deform the tube radially inward against the fitting. A portion of the tube is extended into the recess to form a seal between the tube and the fitting. Preferably the tube is extended into the recess either by expanding the tube longitudinally into the recess during the step of relative longitudinal movement or by inserting the tube longitudinally into the recess during the step of placing the tube over the first portion of the fitting.

BRIEF DESCRIPTION OF THE DRAWINGS

These and further features of the present invention will be apparent with reference to the following description and drawings, wherein:

FIG. 1 is a longitudinal view, in cross-section of a tube and fitting ready for assembly;

FIG. 2 is a longitudinal view, in cross-section, of the tube and fitting of FIG. 1 as assembly is beginning;

FIG. 3 is a is a longitudinal view, in cross-section, of the tube and fitting of FIG. 2 as assembly is partly completed;

FIG. 4 is a longitudinal view, in cross-section, of the tube and fitting of FIG. 3 as assembly is completed;

FIG. 5 is a longitudinal view, in cross-section, view similar to FIG. 2 but showing tube and fitting according to a variation of the present invention;

FIG. 6 is a longitudinal view, in cross-section, of the tube and fitting of FIG. 5 as assembly is partly completed;

FIG. 7 is a longitudinal view, in cross-section, of the tube and fitting of FIG. 6 as assembly is completed;

FIG. 8 is a longitudinal view, in cross-section, view similar to FIG. 2 but showing a tube and fitting according to another variation of the present invention;

FIG. 9 is a longitudinal view, in cross-section, of the tube and fitting of FIG. 8 as assembly is partly completed;

FIG. 10 is a longitudinal view, in cross-section, of the tube and fitting of FIG. 9 as assembly is completed;

FIG. 11 is a longitudinal view, in cross-section, view similar to FIG. 2 but showing a tube and fitting according to yet another variation of the present invention;

FIG. 12 is a longitudinal view, in cross-section, of the tube and fitting of FIG. 11 as assembly is partly completed; and FIG. 13 is a longitudinal view, in cross-section, of the tube and fitting of FIG. 12 as assembly is completed.

DETAILED DESCRIPTION OF PREFERRED EMBODIMENTS

FIGS. 1–4 illustrate a method for assembling a tube and fitting assembly 20 according to the present invention. As best shown in FIG. 1, a rigid fitting 22 has a generally cylindrical forward portion 24 and a generally cylindrical rear portion 26. The rear portion 26 of the fitting 22 may provide a wrench pad, such as a hexagonal surface. The forward portion 24 is sized for extending into a malleable tube 28 and has an outer diameter smaller than the outer diameter of the rear portion 26 to form a forward facing surface or longitudinal abutment 30. The abutment 30 is substantially perpendicular to the peripheral surface of the forward portion 24 of the fitting 22. Formed in the abutment 30 is an annularly-shaped and forward facing groove or recess 32. The recess 32 is sized and located for receiving a portion of the end of the tube 28 as the tube 28 is expanded during the assembly as described in more detail hereafter. The recess 32 forms an annularly-shaped bottom surface which is longitudinally recessed from the abutment 30. Preferably, a gasket 34 is provided at the rear end or "bottom" of the recess 32 as shown in FIGS. 1–4. The gasket 34 is preferably formed of a material which withstands high temperatures such as, for example, silicone. Alternatively, the gasket 34 could be an epoxy, sealant, or other suitable sealing member.

Provided on the forward portion 24 of the fitting 22 is a cylindrically-shaped and radially facing recess or groove 36, that is, a cylindrical surface 38 having a diameter smaller than the outer diameter of remainder of the forward portion 24. The groove 36 and cylindrical surface 38 are contiguous with the abutment 30. Also provided on the forward portion 24 of the fitting is at least one barb 40. The fitting of the illustrated embodiment has two annular-shaped barbs 40, that is, barbs 40 which continuously extend around the periphery of the forward portion 24 of fitting 22. The barbs 40 are preferably annular so that a seal may be obtained between the barbs 40 of the fitting 22 and the tube 28. The barbs 40 are preferably located between the groove 36 and the forward end of the fitting 22. Each barb 40 has a sloping surface 42 facing the forward end of the fitting 22 and has a locking surface 44 facing away from the forward end of the fitting 22. The locking surface 44 is substantially perpendicular to the peripheral surface of the forward portion 24 of the fitting 22.

As best shown in FIG. 1, the tube 28 is positioned over the forward portion 24 of the fitting 22. The tube 28 may loosely telescope over the forward portion 24 of the fitting 22 or it may be a friction fit with the barbs 40 actually scraping along the inside diameter of the tube 28. A portion of the end of the tube 28 is engaging the abutment 30 adjacent the recess 32.

As best shown in FIG. 2, two jaws 46 are clamped on the tube 28 near the forward end of the fitting 22 and locked in position. It is noted that while the illustrated embodiment utilizes two jaws 46, more jaws 46 may be used. Each jaw 46 is provided with a radially inward extending nose projection 48 which contacts the exterior surface of the tube 28. The nose projections 48 are of limited axial length relative to the forward portion 24 of the fitting 22. When the jaws 46 are clamped on the tube 28 as shown in FIG. 2, the inward nose projections 48 of the jaws 46 inwardly compress the tube 28 to make a substantially annular nose ring 50. The nose ring 50 is annular except for the split between the jaws 46. The jaws 46 also have a small forward extension 52 and a longer rearward extension 54. The forward extension 52 preferably has a small clearance relative to the outside diameter of the tube 28. The rearward extension 54 has essentially the same amount of clearance, relative to the tube 28, for guiding the tube 28 between the jaws 46.

A longitudinal force is applied to start the assembly method by providing relative movement between the jaws 46 and the fitting 22. The relative movement can be obtained by longitudinally moving the jaws 46 in a rearward direction relative to a stationary fitting 22, or by longitudinally moving the fitting 22 in a forward direction relative to stationary jaws 46. In the illustrated embodiment, the longitudinal force 56 is applied to a punch 58 brought into contact against the rearward end of the fitting 22 while the jaws 46 are held stationary in a fixed position. Hence longitudinal relative movement is provided between the punch 58 and the jaws 46 and also between the fitting 22 and telescoped tube 28 and the jaws 46.

When the assembly method is about half way completed, as best shown in FIG. 3, the jaws 46 remain closed and do not spring open as the longitudinal relative movement is progressing. The metal material of the tube 28, which is malleable, forms a radially outward extending bulge 60 ahead of the advancing nose ring 50. The bulge 60 may be radially restrained by the forward extension 52 of the jaws 46. The relative longitudinal movement also causes the malleable tube 28 to bulge radially inward and to flow generally radially inward against the sloping surfaces 42.

As best shown in FIG. 4, the relative longitudinal movement is halted when the nose projections 48 of the jaws 46 are adjacent the abutment 30 of the fitting 22. The flowing metal caused by this relative longitudinal movement causes the rearward end of the tube 28 to be jammed longitudinally against the abutment 30, to be contracted radially inward along the length of the fitting and against the cylindrical surface 38 of the groove 36 and the sloping surfaces 42 of the barbs 40, and to be expanded longitudinally into the recess 32 against the gasket 34. FIG. 4 illustrates the tube and fitting assembly 20 when complete except for removal of punch 58 and jaws 46. The material of the tube substantially fills both the groove 36 and the recess 32.

It has been found that a fluid-tight seal can be obtained at each of the barbs 40, at the cylindrical surface 38, at the abutment 30, and at the recess 32. This seal is established by the relative longitudinal movement without any radial inward compression of the jaws 46 as the jaws 46 move longitudinally relative to the punch 58. There is initial radially inward compression only at the nose ring 50. At least when the longitudinal force 56 is removed and the jaws 46 are removed from the tube 28, any relaxation of the tube 28 is a radially inward relaxation rather than a radially outward relaxation as in the prior art. It has been found that the tube 28 expands somewhat radially outward adjacent the abutment 30, expands longitudinally rearward into the recess 32 and into sealing engagement with the gasket 34, and is contracted radially inward into sealing engagement with the cylindrical surface 38 of the groove 36 due to the flow of metal of the malleable tube 28. It has been found that the seal of the tube and fitting assembly 20 will withstand 1,000 PSI fluid pressure and in fact will make a tight seal up to at least the bursting pressure of the tube 28 itself.

In tube and fitting assemblies 20 which have been tested and constructed in accordance with the invention, the barbs 40 have been annular barbs of about 0.015" to 0.030" larger radially than the cylindrical exterior surface of the forward portion 24 of the fitting 22. For example, if the tube 28 used is ⅛" outside diameter, the commercial standard tolerance is ±0.004" and the wall thickness is 0.032". Such a tube and fitting assembly 20 can withstand the 2,800 psi bursting pressure of the tube 28. Even if a number of fittings 22 are manufactured and all mixed together in one tote tray, this may put slight nicks in the barbs 40, but it has been found that these nicks are filled in by the flow of the tube metal by the time the fitting assembly is complete as shown in FIG. 4. In any event, a fluid-tight seal is made at the cylindrical surface 38, at the abutment 30, and at the recess 32 so that the totality of the seals prevents leakage up to the bursting pressure of the tube 28. This seal is maintained at high temperatures such as for example, up to at least 500 degrees Fahrenheit. It is noted that the totality of the seals also permits the barbs 40 to be eliminated if desired. For ⅛" O.D. tube, the commercial standard tolerance is ±0.002" and the wall thickness is 0.028". In this case, the barbs 40 typically may be from 0.005" to 0.015" in radial extent beyond the cylindrical exterior surface of the forward portion 24 of the fitting 22.

FIGS. 5–7, illustrate a tube and fitting assembly 62 which is a variation of the tube and fitting assembly 20 described above with respect to FIGS. 1–4 wherein like references numbers are used for like structure. The tube and fitting assembly 62 is the same except that a tube 64, having a thinner wall thickness, relative to the tube 28, is utilized in conjunction with a sleeve 66. The sleeve 66 is necessary whenever the tube 64 has a wall thickness that is too thin to consistently form the seals as described above. The sleeve 66 has an inner diameter sized to receive the tube 64 therein and a length which extends at least from the abutment 30 to the forward end of the fitting 22. The sleeve 66 has a wall thickness adequate to form the seals in conjunction with the wall thickness of the tube 64. The sleeve 66 is preferably formed of a malleable metal and is preferably formed of the same material as the tube 64.

The assembly method is the same as described above except that both the tube 64 and the sleeve 66 are deformed by the nose projections 48 of the jaws 46 to form the seals. Although the sleeve 66 is only described in detail with regard to the tube and fitting assembly 62 of FIGS. 5–7, it is noted that the sleeve 66 can be utilized with each of the other described embodiments or variations of the present invention.

FIGS. 8–10 illustrate a tube and fitting assembly 68 which is another variation of the tube and fitting assembly 20 described above with respect to FIGS. 1–4 wherein like references numbers are used for like structure. The tube and fitting assembly 68 is the same as described above except that a recess 70 is provided which is deeper relative to the previously described recess 32. The recess 70 is also sized and located for receiving the end of the tube 28 prior to deformation of the tube 28 by the jaws 46. As best shown in FIG. 8, the tube 28 is initially positioned over the forward portion 24 of the fitting 22 with the end of the tube 28 extending into the recess 70 and against the gasket 34.

The assembly method is the same as described above except that the relative longitudinal movement of the fitting 22 and the jaws 46 is not halted until the nose projections 48 of the jaws 46 are generally adjacent the gasket 32. As best shown in FIG. 10, the deformation of the fitting 22 caused by this additional relative longitudinal movement causes the rear portion 26 of the fitting 22 is to be contracted radially inward against the tube 26. It has been found that the rear portion 26 of the fitting 22 contracts radially inward into sealing engagement with the tube 28. Although the relatively deep recess 70 and the additional relative longitudinal movement are only described in detail with regard to the tube and fitting assembly 68 of FIGS. 8–10, it is noted that they can be utilized with each of the other described embodiments or variations of the present invention.

FIGS. 11–13 illustrate a tube and fitting assembly 72 which is a variation of the tube and fitting assembly 68 described above with respect to FIGS. 8–10 wherein like references numbers are used for like structure. The tube and fitting assembly 72 is the same as described above except that at least one auxiliary sealing member 74, 76 is provided between the fitting 22 and the tube 28. In the illustrated embodiment a first auxiliary sealing member 74 is located between the outer surface of the tube 28 and the radially outward side of the recess 70 and a second auxiliary sealing member 76 is located between the inner surface of the tube 28 and outer surface of the forward portion 24 of the fitting 22. Preferably, seats are formed in the rear portion 26 of the fitting 22 and the forward portion 24 of the fitting 22 for the first and second auxiliary sealing members 74, 76 respectively. Each auxiliary sealing member 74, 76 is preferably an o-ring but could alternatively be a flat gasket, epoxy, sealant, or other suitable sealing member. The sealing members 74, 76 are preferably formed of a high temperature material such as, for example, silicone.

The assembly method is the same as described above. As best shown in FIG. 13, the first auxiliary sealing member 74 is compressed when relative longitudinal movement causes the rear portion 26 of the fitting 22 is to be contracted radially inward against the tube 26 and the second auxiliary sealing member 76 is compressed when the relative longitudinal movement causes the tube 28 to be contracted radially inward against the forward 24 portion of the fitting 22. It has been found that the rear portion 26 of the fitting 22 and the tube 28 each contract radially inward to compress the auxiliary sealing members and form additional seals between the tube 28 and the fitting 22. Although the auxiliary sealing members 74, 76 are only described with regard to the tube and fitting assembly 72 of FIGS. 11–13, it is noted that they can be utilized with each of the other described embodiments or variations of the present invention.

Although particular embodiments of the invention have been described in detail, it will be understood that the invention is not limited correspondingly in scope, but includes all changes and modifications coming within the spirit and terms of the claims appended hereto.

What is claimed is:

1. A tube fitting assembly for pressurized fluids comprising:
    a malleable tube;
    a fitting having a forward portion forming an external surface, a rear portion radially larger than said forward portion to form an abutment facing said external surface, and an annular recess formed within said rear portion at said abutment and facing said external surface;
    wherein an end of said tube is radially, inwardly compressed forward of said abutment and onto said external surface of said fitting and longitudinally, rearwardly expanded past said abutment and into said annular recess of said fitting making a fluid-tight seal between the tube and at least one of said external surface and said recess which withstands a fluid pressure within said tube.

2. The tube and fitting assembly as set forth in claim 1, further comprising a seal member within said annular recess at a rear end of said annular recess.

3. The tube and fitting assembly as set forth in claim 2, wherein said seal member is a flat gasket.

4. The tube and fitting assembly as set forth in claim 1, wherein said fitting forward portion has a cylindrical surface contiguous with said abutment and radially recessed from said external surface, and said tube is radially inwardly contracted to said cylindrical surface.

5. The tube and fitting assembly as set forth in claim 1, wherein said fitting has at least one annular barb forward of said abutment on said external surface.

6. The tube and fitting assembly as set forth in claim 1, further comprising a malleable sleeve radially inwardly compressed onto said tube forward of said abutment at said external surface and longitudinally expanded rearward of said abutment into said annular recess.

7. The tube and fitting assembly as set forth in claim 1, wherein at least a portion of said rear portion of said fitting is radially inwardly compressed onto said tube.

8. The tube and fitting assembly as set forth in claim 1, further comprising at least one auxiliary seal member between said fitting and said tube.

9. The tube and fitting assembly as set forth in claim 8, wherein said auxiliary seal member is located between said exterior surface of said fitting and an interior surface of said tube.

10. The tube and fitting assembly as set forth in claim 9, wherein said fitting has at least one annular barb on said external surface and located forward of said abutment and rearward of said auxiliary seal member.

11. The tube and fitting assembly as set forth in claim 8, wherein said auxiliary seal member is located between an outer surface of said tube and an inner surface of said recess.

12. The tube and fitting assembly as set forth in claim 11, wherein at least a portion of said rear portion of said fitting is radially inwardly compressed onto said tube.

13. The tube and fitting assembly as set forth in claim 8, wherein said auxiliary seal member is an o-ring.

14. The tube and fitting assembly as set forth in claim 1, wherein said tube is radially outwardly expanded adjacent said abutment.

15. The tube and fitting assembly as set forth in claim 14, wherein said fitting forward portion has a cylindrical surface contiguous with said abutment and radially recessed from said external surface, and said tube is radially inwardly contracted to said cylindrical surface.

* * * * *